US012699871B2

(12) United States Patent
Zhang et al.

(10) Patent No.: US 12,699,871 B2
(45) Date of Patent: Aug. 4, 2026

(54) METHOD FOR PREDICTING GASIFICATION REACTION CHARACTERISTICS OF BIOMASS CHAR

(71) Applicant: SOUTHEAST UNIVERSITY, Nanjing (CN)

(72) Inventors: Huiyan Zhang, Nanjing (CN); Zhenting Zha, Nanjing (CN); Zefeng Ge, Nanjing (CN); Yuna Ma, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 154 days.

(21) Appl. No.: 18/014,075

(22) PCT Filed: Apr. 27, 2022

(86) PCT No.: PCT/CN2022/089540
§ 371 (c)(1),
(2) Date: Feb. 2, 2023

(87) PCT Pub. No.: WO2023/005302
PCT Pub. Date: Feb. 2, 2023

(65) Prior Publication Data
US 2023/0419073 A1 Dec. 28, 2023

(30) Foreign Application Priority Data
Jul. 26, 2021 (CN) .......................... 202110860387.8

(51) Int. Cl.
G06N 3/006 (2023.01)
G06F 18/214 (2023.01)
G06N 3/084 (2023.01)

(52) U.S. Cl.
CPC ........... *G06N 3/006* (2013.01); *G06F 18/214* (2023.01); *G06N 3/084* (2013.01)

(58) Field of Classification Search
CPC ....... G06N 3/006; G06N 3/084; G06F 18/214
See application file for complete search history.

(56) References Cited

U.S. PATENT DOCUMENTS

| 2019/0002764 A1* | 1/2019 | Lee | C10B 57/045 |
| 2021/0073291 A1* | 3/2021 | Hunter | G06N 3/045 |
| 2022/0340827 A1* | 10/2022 | Wang | G06Q 10/063 |

FOREIGN PATENT DOCUMENTS

| CN | 111950854 A | 11/2020 |
| CN | 112926767 A | 6/2021 |

(Continued)

OTHER PUBLICATIONS

"Artifcial neural networks modelling: Gasification behaviour of palm fibre biochar" Arumugasamy et al. Nov. 2020 pp. 868-878.*

(Continued)

*Primary Examiner* — Sherrod L Keaton
(74) *Attorney, Agent, or Firm* — MUNCY, GEISSLER, OLDS & LOWE, P.C.

(57) ABSTRACT

The present disclosure provides a method for predicting gasification characteristics of biomass char, including the following steps: step 10): acquiring training data of biomass char gasification; step 20): establishing a BP neural network model including an input layer, a hidden layer and an output layer, input parameters of the BP neural network model being char making temperature, char specific surface area and gasification time, and output parameters being char conversion rate; step 30): training the BP neural network model by adopting the training data, and optimizing the BP neural network model by adopting a particle swarm optimization algorithm to obtain a BP neural network model with high prediction precision; and step 40): predicting the char conversion rate by using the BP neural network model with high prediction precision. According to the method, high-fitness simulation can be performed on the gasification (Continued)

process of biomass char, and the char gasification characteristics can be accurately predicted.

6 Claims, 5 Drawing Sheets

(56)                    References Cited

FOREIGN PATENT DOCUMENTS

| | | |
|---|---|---|
| CN | 113657591 A | 11/2021 |
| WO | WO-2017209548 A1 | 12/2017 |

OTHER PUBLICATIONS

"Determining the No. of Hidden Layers in Neural Network by using principal component analysis" Choldum et al. 2020 pp. 490-500.*
"Artifcial neural networks modelling: Gasification behaviour of palm fibre biochar" Arumugasamy et al. ("Arumugasamy") Nov. 2020 pp. 868-878.*
"Determining the number of Hidden Layers in Neural Network by using principal component analysis" Choldum et al. ("Choldum") 2020 pp. 490-500.*

* cited by examiner

METHOD FOR PREDICTING GASIFICATION REACTION CHARACTERISTICS OF BIOMASS CHAR

TECHNICAL FIELD

The present disclosure belongs to the technical field of biomass gasification utilization, and particularly relates to a method for predicting gasification reaction characteristics of biomass char.

BACKGROUND

Electric power is the key to carbon neutralization of energy systems in China, and the utilization of a biomass energy technology in the electric power industry has important significance for promoting the realization of carbon neutralization. A biomass gasification technology is a promising utilization technology, it not only realizes high-efficiency cleaning of biomass, but also can be used for preparing high-quality synthesis gas. However, the gasification process of the biomass is very complex and is generally divided into three stages of pyrolysis, volatile gasification and char gasification. The gasification of the char belongs to a gas-solid heterogeneous reaction, and its reaction rate is far lower than that of pyrolysis and volatile gasification, so that the reaction rate of the biomass gasification is mainly controlled by the reaction activity of the char, and the activity of the char is mainly determined by the temperature, the time and the pore structure of the char.

The biomass has characteristics of high ash content and high alkali metal content, but alkali metal has a certain catalytic effect on the biomass pyrolysis gasification process, which influences the reaction rate of the biomass. Therefore, it is difficult to predict the gasification reaction characteristics of the biomass by a fixed mathematical model. An artificial neural network model does not need to consider the influence of the alkali metal on the gasification characteristics of the biomass, and the establishment of a model for predicting the gasification reactivity of the biomass is completely feasible as long as enough biomass gasification data is provided.

At present, there are some researches on predicting the biomass pyrolysis process by using a BP neural network model, but there are few predictions about the gasification reactivity of the biomass char. Moreover, since a BP neural network has the defects such as low convergence speed and easy falling into local minimum, there is a certain error between predicted data and measured data.

SUMMARY

Technical problems to be resolved in the present disclosure is that a method for predicting gasification reaction characteristics of biomass char is provided, which can perform high-fitness simulation on an air gasification reaction process of the biomass char and can accurately predict the gasification reaction characteristics of the biomass char.

In order to solve above technical problems, the present disclosure provides a method for predicting gasification reaction characteristics of biomass char, including the following steps:

step 10): acquiring training data of gasification reaction of the biomass char;

step 20): establishing a BP neural network model including an input layer, a hidden layer and an output layer, input parameters of the BP neural network model being char making temperature, char sample specific surface area and gasification time, and output parameters being char conversion rate;

step 30): training the BP neural network model by adopting the training data, and optimizing the BP neural network model by adopting a particle swarm optimization algorithm to obtain a BP neural network model with high prediction precision; and step 40): predicting the char conversion rate in the gasification reaction of the biomass char by using the BP neural network model with high prediction precision.

As a further improvement of an embodiment of the present disclosure, the step 30) specifically includes:

step 31): acquiring an initial weight and an initial threshold of the BP neural network model;

step 32): initializing a particle swarm, each particle including the weight and the threshold of the BP neural network model, and giving a random initial position and a random initial speed;

step 33): inputting conditional data in the training data into the BP neural network model to obtain prediction data;

step 34): calculating an error between the prediction data and output data in the training data, and calculating by utilizing Formula (1) to obtain an individual fitness value of particles:

$$F = \frac{1}{2} \sum_{p=1}^{p} \sum_{k=1}^{m} (Y_{pk} - O_{pk})^2 \qquad \text{Formula (1)}$$

where F represents the individual fitness value, $Y_{pk}$ represents an expected output value, $O_{pk}$ represents an output value, k represents a coefficient, and m represents the number of nodes of the output layer;

step 35): determining an individual extreme value and a swarm extreme value of the particle swarm, updating the speed of each particle by utilizing Formula (2), and updating the position of each particle by utilizing Formula (3):

$$V_{id}^{k+1} = wV_{id}^k + c_1 r_1 (P_{id}^k - X_{id}^k) + c_2 r_2 (P_{gd}^k - X_{id}^k) \qquad \text{Formula (2)}$$

$$X_{id}^{k+1} = X_{id}^k + V_{id}^{k+1} \qquad \text{Formula (3)}$$

where $$V_{id}^{k+1}$$

represents the speed of an $i^{th}$ particle in k+1 iterations, $$V_{id}^k$$

represents the speed of the $i^{th}$ particle in k iterations, w represents an inertia weight, $c_1$ represents a first learning factor, $c_2$ represents a second learning factor, $r_1$ and $r_2$ both represent random numbers between 0 and 1, $$X_{id}^{k+1}$$

represents the position of the $i^{th}$ particle in k+1 iterations, $$X_{id}^k$$

represents the position of the $i^{th}$ particle in k iterations, $$P_{id}^k$$

represents the individual extreme value, and $$P_{gd}^k$$

represents the swarm extreme value;

step 36): if meeting an end condition, outputting the weight and the threshold, and executing step 37); otherwise, continuously executing the step 35), and in each iteration, enabling the particles to track the individual extreme value and the swarm extreme value to realize autonomous updating; and step 37): updating the weight and the threshold output in the step 36) into the BP neural network model, and inputting the conditional data in the training data into the updated BP neural network model to obtain the prediction data; if meeting the requirements, determining that the updated BP neural network model is a qualified BP neural network model; otherwise, executing the step 34).

As a further improvement of the embodiment of the present disclosure, the meeting the requirements specifically includes:

calculating to obtain a fitting degree by using Formula (4):

$$R^2 = \frac{\sum_{i=1}^n (\overline{y}_l - y_i)^2}{\sum_{i=1}^n \overline{y}_l^2 \sum_{i=1}^n y_i^2} \qquad \text{Formula (4)}$$

where $\overline{y}_l$ represents a predicted value, $y_i$ represents a measured value, and $R^2$ represents the fitting degree; and if the fitting degree is greater than 0.99, the requirements are met.

As a further improvement of the embodiment of the present disclosure, the step 10) specifically includes:

step 101): selecting homogeneous biomass as a test sample, performing drying and screening pretreatment, then performing pyrolysis gasification tests at different char making temperatures through a tubular furnace, and recording gasification time at different char making temperatures;

step 102): processing obtained thermal weight loss curves of the test sample at different temperatures, and performing reaction kinetic parameter calculation on data to obtain char conversion rates at different char making temperatures;

step 103): performing specific surface area test experiments on a pore structure of the char sample at different temperatures to obtain char specific surface areas at different char making temperatures; and step 104): reflecting a distribution rule of the gasification characteristics of the char by using pore structure distribution of the char, forming the conditional data of the training data by using the char making temperatures, the char specific surface areas and the gasification time obtained through a plurality of gasification tests, and forming the output data of the training data by using the char conversion rates obtained through the plurality of gasification tests.

As a further improvement of the embodiment of the present disclosure, the step 10) further includes:

step 105): normalizing the training data by using Formula (5):

$$P = \frac{P_1 - P_{min}}{P_{max} - P_{min}} \qquad \text{Formula (5)}$$

where $P_l$ represents the original training data, P represents the normalized training data, $P_{min}$ represents a preset minimum value, and $P_{max}$ represents a preset maximum value.

As a further improvement of the embodiment of the present disclosure, in the BP neural network model, a transfer function between the input layer and the hidden layer is a tansig function $$f_1(x) = \tan sig(x) = \frac{2}{1 + e^{-2x}} - 1,$$

and the transfer function between the hidden layer and the output layer is a purelin type $f_2(x)=x$ function.

As a further improvement of the embodiment of the present disclosure, the step 20) further includes:

calculating the number of layers of the hidden layer by using Formula (6) according to the number of the input parameters and the number of the output parameters:

$$m = \sqrt{n + l} + a \qquad \text{Formula (6)}$$

where m represents the number of layers of the hidden layer, n represents the number of the input parameters, l represents the number of the output parameters, and a represents a constant from 1 to 10.

Compared with the prior art, the technical solutions of the present disclosure have the following beneficial effects: in the method for predicting gasification reaction characteristics of biomass char provided by the embodiment of the present disclosure, the training data of the gasification reaction of the biomass char are trained through the BP neural network, the BP neural network model is optimized by using the particle swarm optimization (PSO) algorithm, and the optimal weight and threshold of the BP neural network model are updated, thereby reducing the prediction error of the BP neural network model, enhancing the prediction accuracy, and making the prediction of the gasification activity of biomass char more accurate.

5

6

Figure 2:
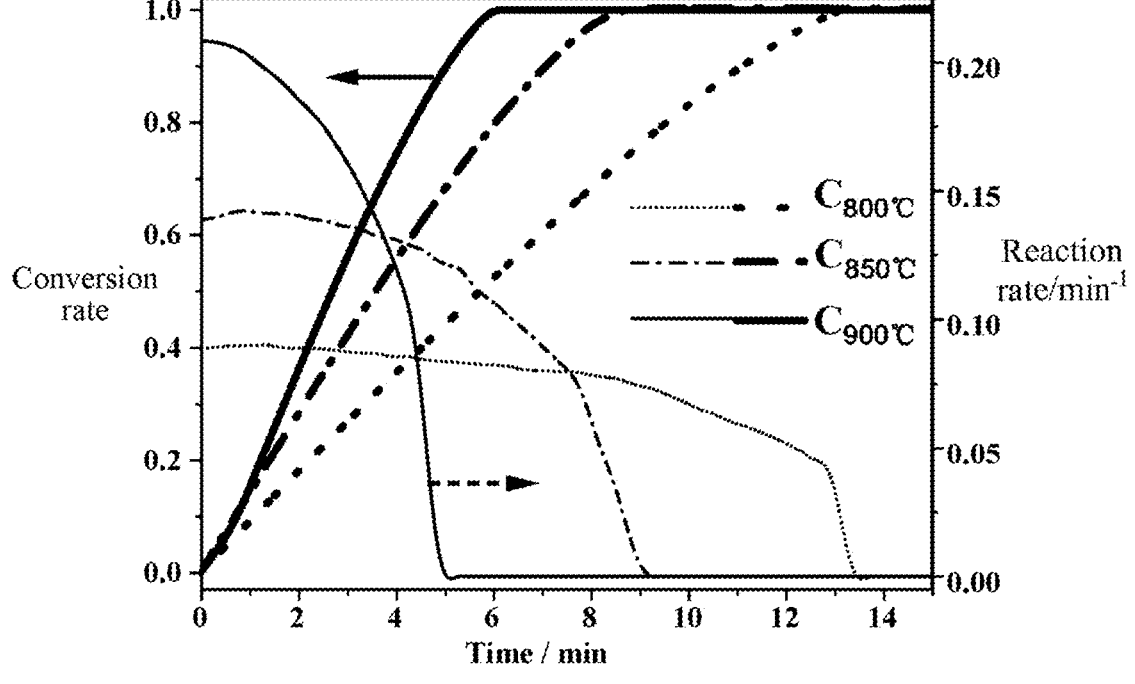
Figure 3:
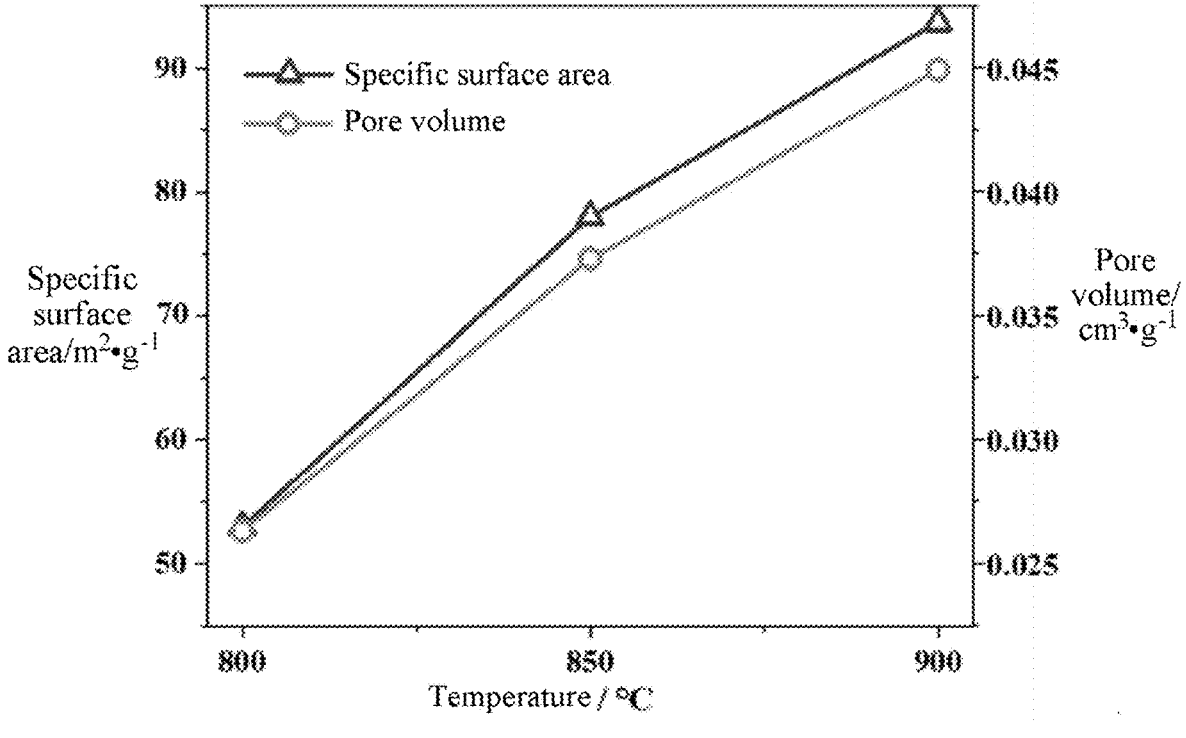
Figure 4:
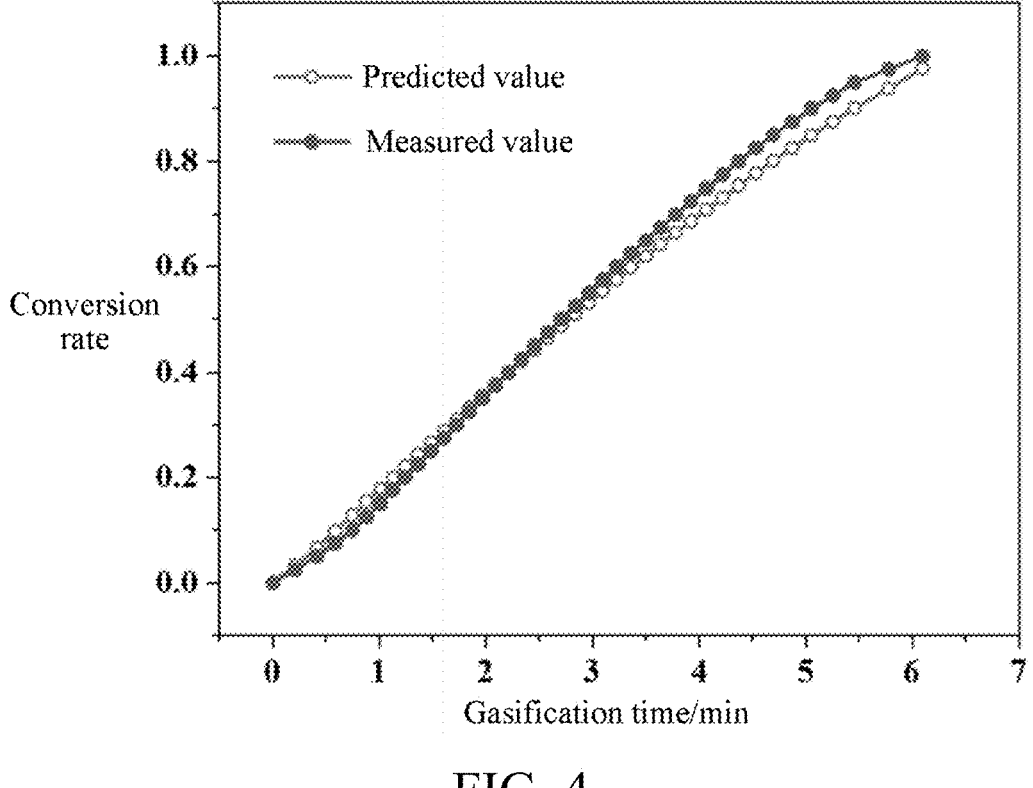
Figure 5:
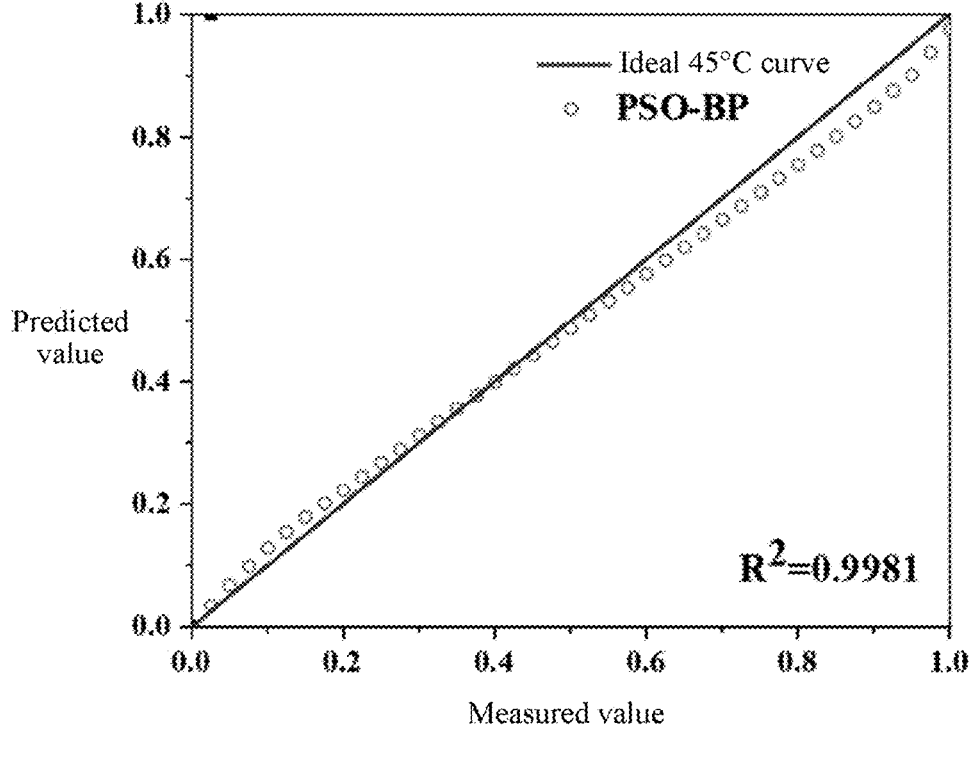

FIG. 2 is an isothermal gasification characteristic rule chart of furfural residues at different char making temperatures in an example 1 of the present disclosure;

FIG. 3 is a change rule chart of a char specific surface area and a pore volume of furfural residues along with temperature in an example 1 of the present disclosure;

FIG. 4 is a comparison chart of a measured value and a predicted value of a char conversion rate of furfural residues in an example 1 of the present disclosure; and FIG. 5 is a regression line chart of a predicted value and a measured value in an example 1 of the present disclosure.

DETAILED DESCRIPTION

The technical solutions of the present disclosure are described below in detail.

Figure 1:
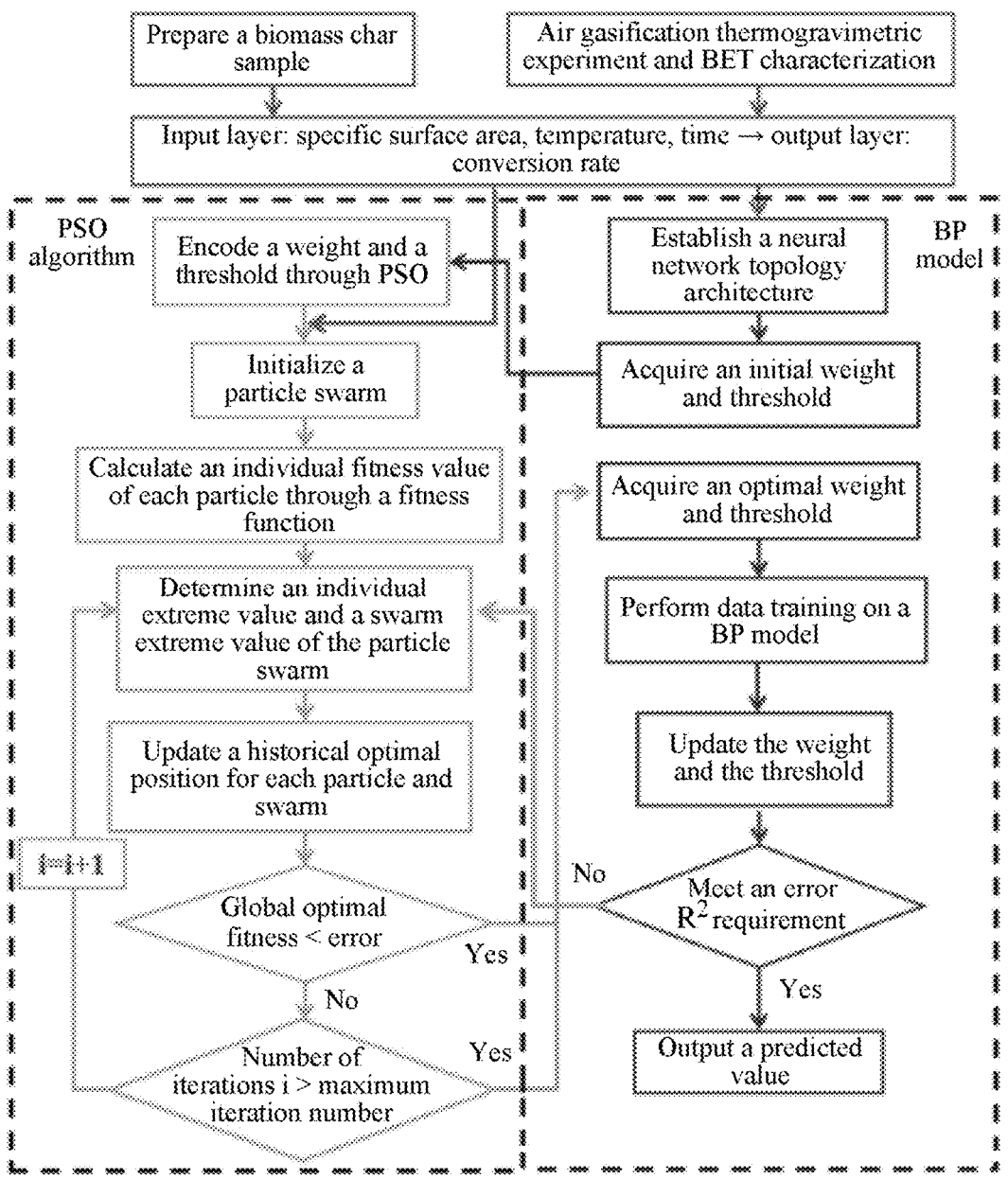
FIG. 1 is a flow chart of a method for predicting gasification reaction characteristics of biomass char of an embodiment of the present disclosure.

An embodiment of the present disclosure provides a method for predicting gasification reaction characteristics of biomass char, as shown in FIG. 1, including the following steps:

Step 10): training data of gasification reaction of the biomass char is acquired.

Step 20): a BP neural network model including an input layer, a hidden layer and an output layer is established, input parameters of the BP neural network model are char making temperature, char sample specific surface area and gasification time, and output parameters are char conversion rate.

Step 30): the BP neural network model is trained by adopting the training data, and the BP neural network model is optimized by adopting a particle swarm optimization algorithm to obtain a BP neural network model with high prediction precision.

Step 40): the char conversion rate in the gasification reaction of the biomass char is predicted by using the BP neural network model with high prediction precision.

In the method for predicting gasification reaction characteristics of biomass char provided by the embodiment of the present disclosure, the training data of the gasification reaction of the biomass char are trained through the BP neural network, the BP neural network model is optimized by using the particle swarm optimization (PSO) algorithm, and the optimal weight and threshold of the BP neural network model are updated, thereby reducing the prediction error of the BP neural network model, enhancing the prediction accuracy, and making the prediction of the gasification activity of biomass char more accurate.

Preferably, as shown in FIG. 1, the step 30) specifically includes:

Step 31): an initial weight and an initial threshold of the BP neural network model are acquired.

Step 32): a particle swarm is initialized, each particle includes the weight and the threshold of the BP neural network model, and a random initial position and a random initial speed are given.

Step 33): conditional data in the training data is input into the BP neural network model to obtain prediction data.

Step 34): an error between the prediction data and output data in the training data is calculated, calculating by utilizing Formula (1) to obtain an individual fitness value of particles:

$$F = \frac{1}{2}\sum_{p=1}^{p}\sum_{k=1}^{m}(Y_{pk} - O_{pk})^2 \qquad \text{Formula (1)}$$

where F represents the individual fitness value, $Y_{pk}$ represents an expected output value, $O_{pk}$ represents an output value, k represents a coefficient, and m represents the number of nodes of the output layer.

Step 35): iterative search is performed on each particle in a solution space, and a new solution is searched by continuously adjusting the position of the particle, thereby determining an individual extreme value and a swarm extreme value of a particle swarm, updating the speed of each particle by using Formula (2), and updating the position of each particle by using Formula (3):

$$V_{id}^{k+1} = wV_{id}^{k} + c_1 r_1 (P_{id}^{k} - X_{id}^{k}) + c_2 r_2 (P_{gd}^{k} - X_{id}^{k}) \qquad \text{Formula (2)}$$

$$X_{id}^{k+1} = X_{id}^{k} + V_{id}^{k+1} \qquad \text{Formula (3)}$$

where $$V_{id}^{k+1}$$

represents the speed of an $i^{th}$ particle in k+1 iterations, $$V_{id}^{k}$$

represents the speed of the it particle in k iterations, w represents an inertia weight, $c_1$ represents a first learning factor, $c_2$ represents a second learning factor, $r_1$ and $r_2$ both represent random numbers between 0 and 1, $$X_{id}^{k+1}$$

represents the position of the $i^{th}$ particle in k+1 iterations, $$X_{id}^{k}$$

represents the position of the $i^{th}$ particle in k iterations, $$P_{id}^{k}$$

represents the individual extreme value, and $$P_{gd}^{k}$$

represents the swarm extreme value.

Step 36): if an end condition is met, the weight and the threshold are output, and step 37) is executed; otherwise, the step 35) is continuously executed, where each time the step 35) is executed, an iteration is completed, and in each iteration, the particles can track the individual extreme value and the swarm extreme value to realize autonomous updating; and the end condition is that the global optimal fitness is smaller than an error or the number of iterations reaches a preset maximum iteration number.

Step 37): the weight and the threshold output in the step 36) are updated into the BP neural network model, and the conditional data in the training data is input into the updated BP neural network model to obtain the prediction data. If the requirements are met, it's determined that the updated BP neural network model is a qualified BP neural network model; otherwise, executing the step 34).

According to the method provided by the embodiment of the present disclosure, the weight and threshold of the BP neural network model are updated by using the SPO algorithm, so that the convergence speed of the BP neural network is improved, and the defects such as easy falling into local minimum are overcome.

Preferably, the meeting the requirement specifically includes:

calculating to obtain a fitting degree by using Formula (4):

$$R^2 = \frac{\sum_{i=1}^{n}(\overline{y}_i - y_i)^2}{\sum_{i=1}^{n}\overline{y}_i^2 \sum_{i=1}^{n}y_i^2} \qquad \text{Formula (4)}$$

where $\overline{y}_i$ represents a predicted value, $y_i$ represents a measured value, and $R^2$ represents the fitting degree.

If the fitting degree is greater than 0.99, the requirements are met.

Preferably, the step 10) specifically includes:

Step 101): selecting homogeneous biomass as a test sample, performing drying and screening pretreatment, then performing pyrolysis gasification tests at different char making temperatures through a tubular furnace, and recording gasification time at different char making temperatures.

Step 102): processing obtained thermal weight loss curves of the test sample at different temperatures, and performing reaction kinetic parameter calculation on data to obtain char conversion rates at different char making temperatures.

Step 103): performing specific surface area test (BET) experiments on a pore structure of the char sample at different temperatures to obtain char specific surface areas at different char making temperatures.

Step 104): reflecting a distribution rule of the gasification characteristics of the char by using pore structure distribution of the char, setting the char making temperatures, the char specific surface areas and the gasification time obtained through a plurality of gasification tests as the conditional data of the training data, and setting the char conversion rates obtained through the plurality of gasification tests as the output data of the training data.

Preferably, the step 10) further includes:

Step 105): normalizing the training data by using Formula (5):

$$P = \frac{P_1 - P_{min}}{P_{max} - P_{min}} \qquad \text{Formula (5)}$$

where $P_1$ represents the original training data, P represents the normalized training data, $P_{min}$ represents a preset minimum value, and $P_{max}$ represents a preset maximum value.

According to the embodiment of the present disclosure, the training data is normalized and then used for training the neural network model, so that relatively large magnitude order difference of the input data and the output data can be avoided, and as a result, the error of a prediction result can be reduced.

Preferably, in the BP neural network model, a transfer function between the input layer and the hidden layer is a tansig function $$f_1(x) = \tan sig(x) = \frac{2}{1 + e^{-2x}} - 1,$$

the transfer function between the hidden layer and the output layer is a purelin type $f_2(x)=x$ function, and the training function of the BP neural network model is a trainlm function.

Preferably, the step 20) further includes:

calculating the number of layers of the hidden layer by using Formula (6) according to the number of the input parameters and the number of the output parameters:

$$m = \sqrt{n + 1} + a \qquad \text{Formula (6)}$$

where m represents the number of layers of the hidden layer, n represents the number of the input parameters, l represents the number of the output parameters, and a represents a constant from 1 to 10.

A specific example is provided as follows for verifying the performance of the embodiment of the present disclosure.

Example 1

Step 1): Furfural residue char was prepared at different char making temperatures through a tubular furnace, isothermal gasification thermogravimetric experiment and BET characterization were performed, and training data was acquired.

Homogeneous furfural residues with particle sizes ranging from 40 to 60 meshes were selected as biomass, the biomass was pre-treated by drying and screening, pyrolysis was performed in the tubular furnace at temperatures of 800° C., 850° C. and 900° C. respectively to prepare furfural residue char samples (C800° C., C850° C. and C900° C.), and a gas cylinder containing 10% $O_2$+90% $N_2$ was provided for the thermogravimetric experiment.

In order to guarantee the measurement accuracy of the thermogravimetric experiment, about 8 mg by mass of the samples at the temperatures of C800° C., C850° C. and C900° C. were taken each time, where the nitrogen flow was 25 mL/min.

The temperature was increased to 900° C. in a gas 1 (99.999% of $N_2$) atmosphere at a temperature increase rate of 30 K/min, and after staying for 10 min, the gas was switched into gas 2 (10% $O_2$+90% $N_2$) for performing an air gasification experiment at a constant temperature of 900° C. for 30 min.

The obtained thermal weight loss curves at the temperatures of C800° C., C850° C. and C900° C. were processed, and reaction kinetic parameter calculation was performed on the data. As shown in FIG. 2, the time of complete char gasification was gradually advanced along with the increase of the char making temperature, and the gasification ending time at the temperature of C900° C. was about twice that at the temperature of C800° C.

A BET experiment was performed for the changes of pore structures of the particles at the temperatures of C800° C., C850° C. and C900° C. to obtain a rule that the specific surface area of the furfural residue char particles changed along with the char making temperature. As shown in FIG. 3, the specific surface area and pore volume were increased due to the increase of the gasification temperature, so that the pore structure of the char was more developed, and the gasification reaction rate was higher.

Step 2): A BP neural network model was trained by adopting the training data, and the BP neural network model was optimized by adopting a PSO algorithm to obtain a PSO-BP model.

Step 3): The char making temperature, char sample specific surface area and gasification time were input into the PSO-BP model for prediction to obtain a predicted char conversion rate.

The prediction data fitted by the PSO-BP model was compared with output data, the result was as shown in FIG. 4, and the correlation coefficient $R^2$ reached 0.9981. As shown in FIG. 5, the accuracy of the PSO-BP model in the method of the present disclosure was verified, and a reliable method was provided for research of the reaction characteristics of the biomass char in the gasification process.

The basic principles, main features, and advantages of the present disclosure are shown and described above. A person skilled in the art may understand that the present disclosure is not limited to the foregoing specific embodiments. Descriptions in the foregoing specific embodiments and specification are only intended to further illustrate the principles of the present disclosure. Various modifications and improvements are made in the present disclosure without departing from the spirit and the scope of the present disclosure, and these modifications and improvements shall fall within the protection scope of the present disclosure. The protection scope of the present disclosure is subject to the claims and equivalents thereof.

What is claimed is:

1. A method for predicting gasification reaction characteristics of biomass char, comprising the following steps:

step 10): acquiring training data of gasification reaction of the biomass char;

step 20): establishing a backpropagation (BP) neural network model comprising an input layer, a hidden layer and an output layer, input parameters of the BP neural network model being char making temperature, char sample specific surface area and gasification time, and output parameters being char conversion rate;

step 30): training the BP neural network model by adopting the training data, and optimizing the BP neural network model by adopting a particle swarm optimization algorithm to obtain a BP neural network model, wherein the step 30) comprises:

step 31): acquiring an initial weight and an initial threshold of the BP neural network model;

step 32): initializing a particle swarm, each particle comprising the weight and the threshold of the BP neural network model, and giving a random initial position and a random initial speed;

step 33): inputting conditional data in the training data into the BP neural network model to obtain prediction data;

step 34): calculating an error between the prediction data and output data in the training data, and calculating by utilizing Formula (1) to obtain an individual fitness value of particles:

$$F = \frac{1}{2}\sum_{p=1}^{p}\sum_{k=1}^{m}(Y_{pk} - O_{pk})^2; \qquad \text{Formula (1)}$$

step 35): determining an individual extreme value and a swarm extreme value of the particle swarm, updating the speed of each particle by utilizing Formula (2), and updating the position of each particle by utilizing Formula (3):

$$V_{id}^{k+1} = wV_{id}^{k} + c_1 r_1\left(P_{id}^{k} - X_{id}^{k}\right) + c_2 r_2\left(P_{gd}^{k} - X_{id}^{k}\right) \qquad \text{Formula (2)}$$

$$X_{id}^{k+1} = X_{id}^{k} + V_{id}^{k+1} \qquad \text{Formula (3)}$$

wherein $$V_{id}^{k+1}$$

represents the speed of an $i^{th}$ particle in k+1 iterations, $$V_{id}^{k}$$

represents the speed of the $i^{th}$ particle in k iterations, w represents an inertia weight, $c_1$ represents a first learning factor, $c_2$ represents a second learning factor, $r_1$ and $r_2$ both represent random numbers between 0 and 1, $$X_{id}^{k+1}$$

represents the position of the $i^{th}$ particle in k+1 iterations, $$X_{id}^{k}$$

represents the position of the $i^{th}$ particle in k iterations, $$P_{id}^{k}$$

represents the individual extreme value, and $$P_{id}^{k}$$

represents the swarm extreme value;

step 36): if meeting an end condition, outputting the weight and the threshold, and executing step 37); otherwise, continuously executing the step 35), and in each iteration, enabling the particles to track the individual extreme value and the swarm extreme value to realize autonomous updating; and step 37): updating the weight and the threshold output in the step 36) into the BP neural network model, and inputting the conditional data in the training data into the updated BP neural network model to obtain the prediction data; calculating to obtain a fitting degree $R^2$ by using Formula (4):

$$R^2 = \frac{\sum_{i=1}^{n}(\overline{y}_l - y_i)^2}{\sqrt{\sum_{i=1}^{n}\overline{y}_l^2}\sum_{i=1}^{n}y_i^2} \qquad \text{Formula (4)}$$

wherein $\overline{y}_i$ represents a predicted value, $y_i$ represents a measured value, and $R^2$ represents the fitting degree, and if the fitting degree is greater than 0.99, determining that the requirements are met and that the updated BP neural network model is a qualified BP neural network model; otherwise, executing the step 34); and step 40): predicting the char conversion rate in the gasification reaction of the biomass char by using the BP neural network model.

2. The method for predicting gasification reaction characteristics of biomass char according to claim 1, wherein in the step 36), the end condition is that the global optimal fitness is smaller than an error or the number of iterations reaches a preset maximum iteration number.

3. The method for predicting gasification reaction characteristics of biomass char according to claim 1, wherein the step 10) specifically comprises:

step 101): selecting homogeneous biomass as a test sample, performing drying and screening pretreatment, then performing pyrolysis gasification tests at different char making temperatures through a tubular furnace, and recording gasification time at different char making temperatures;

step 102): processing obtained thermal weight loss curves of the test sample at different temperatures, and performing reaction kinetic parameter calculation on data to obtain char conversion rates at different char making temperatures;

step 103): performing specific surface area test experiments on a pore structure of the char sample at different temperatures to obtain char specific surface areas at different char making temperatures; and step 104): reflecting a distribution rule of the gasification characteristics of the char by using pore structure distribution of the char, forming the conditional data of the training data by using the char making temperatures, the char specific surface areas and the gasification time obtained through a plurality of gasification tests, and forming the output data of the training data by using the char conversion rates obtained through the plurality of gasification tests.

4. The method for predicting gasification reaction characteristics of biomass char according to claim 3, wherein the step 10) further comprises:

step 105): normalizing the training data by using Formula (5):

$$P = \frac{P_1 - P_{min}}{P_{max} - P_{min}} \qquad \text{Formula (5)}$$

wherein $P_1$ represents the original training data, $P$ represents the normalized training data, $P_{min}$ represents a preset minimum value, and $P_{max}$ represents a preset maximum value.

5. The method for predicting gasification reaction characteristics of biomass char according to claim 1, wherein in the BP neural network model, a transfer function between the input layer and the hidden layer is a tansig function $$f_1(x) = \tan sig(x) = \frac{2}{1 + e^{-2x}} - 1,$$

and the transfer function between the hidden layer and the output layer is a purelin type $f_2(x)=x$ function.

6. The method for predicting gasification reaction characteristics of biomass char according to claim 1, wherein the step 20) further comprises:

calculating the number of layers of the hidden layer by using Formula (6) according to the number of the input parameters and the number of the output parameters:

$$m = \sqrt{n + l} + a \qquad \text{Formula (6)}$$

wherein m represents the number of layers of the hidden layer, n represents the number of the input parameters, l represents the number of the output parameters, and a represents a constant from 1 to 10.

* * * * *